United States Patent Office 3,030,667
Patented Apr. 24, 1962

3,030,667
METHOD OF PREPARING AMYLOSE FILM, TUBING, AND THE LIKE
Walter B. Kunz, Springfield, Pa., assignor to American Viscose Corporation, Philadelphia, Pa., a corporation of Delaware
No Drawing. Filed Oct. 5, 1959, Ser. No. 844,176
9 Claims. (Cl. 18—57)

This invention relates to a method of preparing amylose film, tubing and the like. More particularly it relates to a continuous method of preparing film, tubes and similar articles from the starch component or "A" fraction known as amylose.

Several methods have been proposed for the formation of amylose film and the like. Prior methods usually require controlled humidity and temperatures appreciably above room temperature for the preparation of amylose solutions, and the equipment necessary for these operations is usually specially made and therefore more costly. Several of the known methods require the use of a distillation procedure for removing various agents from the amylose solution prior to casting.

A more recently issued patent, U.S. 2,902,336, teaches that fibers and, incidentally, films can be prepared by dissolving amylose in a caustic solution, and extruding the solution into a concentrated aqueous ammonium sulphate solution. It is stated in this patent that the addition of an acid to the concentrated ammonium sulfate coagulating bath did not bring about the desired result. Thus, the film or fiber formed was very weak and difficult to handle for further processing.

A continuous process of forming amylose film or tubing by extruding into a coagulating bath consisting of a concentrated aqueous ammonium sulfate solution has at least one serious drawback. In such a continuous process the danger of the formation and release of pungent, irritating vaporous ammonia will necessitate the use of expensive venting equipment. The handling of the precipitated amylose material after leaving a coagulating solution of concentrated ammonium sulfate would be extremely difficult in the presence of ammonia or bulky venting equipment. The incorporation of acid to prevent the formation of ammonia would not be feasible since poor film would result.

It is an object of the present invention to provide a method of forming clear, strong, stable amylose film.

It is another object of this invention to provide a method of forming amylose film wherein raised temperatures are not required.

It is a still further object of this invention to provide a method of forming amylose film wherein expensive processing equipment is not needed.

To meet the above objects and in accordance with this invention a method of forming amylose film, tubing and the like comprises forming an aqueous solution containing from 15 to 30 percent by weight of amylose, preferably 20 to 28 percent, and from about 4 to 12 percent by weight of sodium hydroxide, preferably 5 to 7.5 percent, casting said solution into a shaped article of a uniform thickness of at least 0.012 inch, and treating the cast solution with an aqueous coagulating solution selected from the group consisting of (1) from about 10 to 18 percent by weight of sulfuric acid and from about 14 to 28 percent by weight of sodium sulfate, and (2) from about 10 to 28 percent by weight of orthophosphoric acid and from about 15 to 35 percent by weight of disodium phosphate. The combination of acid and salt as described above is critical for the formation of satisfactory film or tubing. The use of acid alone as the coagulant produces a weak, unsatisfactory film or tubing since it is formed too quickly to allow proper molecular orientation and any shaped article which is formed swells undesirably when immersed in water. The salt alone will not supply sufficient acidity to coagulate the amylose solution within a reasonable time for a continuous process. On the other hand, the acid component of the combination supplies sufficient hydrogen ion concentration to quickly neutralize the caustic amylose solution and precipitate amylose film, tubing or the like. The alkali salt aids in maintaining the acidity for the continuous process and, more importantly, forms a hydrate in aqueous solution which acts to prevent or suppress any swelling of the amylose film which may occur in the presence of the acid. In addition, the combination of acid and salt unexpectedly allows the formation of strong stable film and tubes having thicknesses of at least about 0.002–0.004 inch. It is theorized that at a minimum casting or extruding thickness of at least 0.012 inch, the rate of coagulation is such as to allow sufficient molecular orientation of the amylose to provide a strong material. In a preferred embodiment of this invention about 20 to 28 percent amylose is present in the caustic amylose solution. This amount of amylose forms a rather viscous solution but one which is easily cast to the thickness generally used for films and tubing. Thinner amylose castings such as those used in extruding fibers or yarns are not satisfactorily produced with the coagulating solution of this invention because of the rapid rate of coagulation.

The sulfate coagulating bath preferably contains from 12 to 15 (weight) percent sulfuric acid and from 20 to 24 (weight) percent sodium sulfate while the phosphate coagulating bath preferably contains from 15 to 25 (weight) percent orthophosphoric acid and from 20 to 30 (weight) percent disodium phosphate.

The ammonium salts of the respective coagulating acids are also useful as components of the coagulating solution as they supply additional acidity for neutralization of the caustic alkali in the amylose solution. Generally ammonium sulfate is useful in the sulfate coagulating solution in amounts ranging from 16 to 34 (weight) percent and preferably from 19 to 25 (weight) percent. Ammonium phosphate is useful in the phosphate coagulating solution in amounts ranging from 20 to 40 and preferably from 25 to 35 (weight) percent.

The coagulating solution is generally applied to the cast amylose by running the amylose through a coagulating bath, by spraying or by any other suitable means.

The coagulated amylose is beneficially washed after emerging from the coagulating bath. Washing can be accomplished by a water bath or spray provided that the amylose has sufficiently coagulated. If complete coagulation has not occurred, the precipitated film or tubing should first be washed in a dilute solution of sodium sulfate (1–2%) or a combination of mono- or disodium phosphate (1–3%) with sufficient orthophosphoric acid (0.5–1.5%) to eliminate any disodium phosphate, and then water washed. In practice it has been found advantageous to run the cast amylose through several coagulating baths and several wash baths to obtain finished material.

Generally, amounts of the salt and acid components above the prescribed useful amounts will present solubility problems in aqueous solution. In addition, the temperature of the coagulating solution should be kept below 50° C. to prevent the loss of water causing precipitation of salts. The temperature of the aqueous coagulating solution is preferably kept slightly above room temperature.

Plasticizing agents such as glycerol, sorbitol and the like are generally used to treat the precipitated amylose. The plasticizer is placed in the caustic amylose solution, or the precipitated amylose is treated after it is formed.

It is preferred to treat the amylose with the plasticizer after being completely washed since much of the plasticizer is lost in the washing procedure. Treatment is best obtained by running the water washed amylose material through a bath of the plasticizer.

The preparation of the caustic amylose solution is preferably carried out by first forming the desired aqueous sodium hydroxide solution and then slowly sifting in the proper amount of amylose powder. A small amount, from 0.05 to 0.5 (weight) percent of sodium sulfite may advantageously be incorporated in the caustic solvent to prevent oxidative degradation of the amylose. Deaeration of the caustic amylose solution prior to casting or extruding to remove any air bubbles was found to be most desirable.

The following examples are presented to demonstrate the method of this invention.

Example I 264 grams (22 wt. percent of final sol.) of a commercially available amylose powder containing about 85 weight percent amylose, about 15 percent amylopectin based on the dried weight and having a moisture content of about 9 weight percent was slowly sifted into an aqueous solution containing 60 grams (5 percent) of sodium hydroxide and 72 grams of glycerol, at 25° C. The resulting caustic amylose solution was deaerated by pouring the solution into a heavy filter flask and applying suction. Films (0.020 inch thick) of this amylose solution were cast on glass plates and were then coagulated by immersing the glass plate bearing the film in a coagulating bath at 25° C. containing the following: 630 grams (21 percent) of anhydrous sodium sulfate, 406 grams (13 percent) of sulfuric acid (96 percent) and 1,964 grams of distilled water.

After the films were coagulated for a period of 10 minutes, they were immersed for at least 20 minutes in flowing water at 43°–50° C. After washing, the films were plasticized by immersion for 10 minutes at 25° C. in a bath containing 300 grams glycerol and 1684 grams of distilled water. The films were dried on frames at 75° F. and 45% relative humidity. The prepared films were transparent and resistant to tear and breakage. The film was rather soft because of the high plasticizer content.

Example II 16 grams (8 wt. percent of final sol.) of the amylose powder of Example I was slowly added to an aqueous caustic solution containing 8 grams (4 wt. percent of final sol.) of sodium hydroxide and 6 grams of glycerol while the solution was being stirred. The solution was poured into a heavy filtering flask and deaerated by applying suction to the flask.

A coagulating bath was prepared containing 360 grams (about 17 percent) of orthophosphoric acid (85 percent acid), 400 grams (about 19 percent) disodium phosphate and 1340 grams of distilled water.

The caustic amylose solution was poured on a clean glass plate to form a thick film of solution. The glass plate partially covered by the amylose solution was immersed in the coagulating bath (25° C.). A continuous film of amylose was formed on the plate when the caustic content of the solution was neutralized by the phosphoric acid. The film however was not sufficiently strong to be completely self-supporting. The film was also very cloudy.

The above example serves to demonstrate the necessity for having a caustic amylose solution containing larger amounts of amylose in order to obtain a satisfactory film with the method of this invention.

Example III

An attempt to produce amylose fiber or yarn proceeded as follows: A solution of 20 percent of the amylose powder of Example I and 5 percent sodium hydroxide was prepared by mixing with a paddle mixer and then was filtered. An attempt to spin a 400 denier yarn at 15 m./min. on a standard viscose spinning machine was made. A jet having an orifice 0.0025 inch in diameter was used with 60 cm. immersion. A coagulating bath comprising 10 percent sulfuric acid, 35 percent sodium sulfate in distilled water at 50° C. was prepared. The caustic amylose solution was extruded into this coagulating bath. The bath coagulated the amylose but the yarn was too weak to lace up on the spinning machine and no sample was collected. This same amylose solution was extruded into an aqueous coagulating bath containing 15 percent sulfuric acid and 35 percent sodium sulfate. However, the yarn was even weaker than that previously formed and could not be laced on the machine.

It is obvious from the results of the foregoing example that amylose solutions cast or extruded in thicknesses of appreciably less than 0.012 inch, such as those used in extruding fiber and yarn, are unsuitable for the method of this invention.

Example IV 264 grams (22 percent) of the amylose powder of Example I was slowly sifted into an aqueous caustic solution containing 60 grams of sodium hydroxide and 72 grams of glycerol. The solution was deaerated.

A coagulating bath was prepared containing 104 grams (about 2 percent) sulfuric acid (96 percent), 375 grams (7.5 percent) sodium sulfate, 1250 grams (25 percent) ammonium sulfate and 3271 grams of distilled water.

The caustic amylose solution was allowed to flow into a long glass tube and through an orifice into the coagulating bath. A narrow ribbon was formed as the amylose solution passed into the coagulating bath. Portions of the ribbon were washed in distilled water and dried. The ribbon which was obtained was clear and fairly strong.

Example V

A caustic amylose solution as described in Example IV was caused to flow (two lbs. per square inch pressure) through a glass tube 40 inches long and having a bent end containing an orifice of 0.0625 inch in diameter. The glass tube was inserted in a graduated cylinder containing a coagulating bath consisting of 1425 grams (28.5 percent) disodium phosphate (anhydrous), 1156 grams (about 23 percent) orthophosphoric acid (85 percent) and 2419 grams of distilled water. The coagulating bath was equivalent to a 48.15 percent solution of monobasic sodium phosphate. As the amylose solution was extruded through the orifice of the glass tube, a ribbon of amylose was formed which rose slowly through approximately 18–19 inches of the coagulating bath. Several formed ribbons were removed from the bath, dried at room temperature, washed in water, plasticized in 5 percent glycerol solution, wound on rolls and allowed to dry. All experimental work in this experiment was carried out at 25° C.

Example VI

An amylose film was prepared on a commercial type production machine in the following manner. An amylose solution was prepared by dissolving 25 parts by weight of the amylose powder of Example I in a solution containing 6 parts of sodium hydroxide, 0.1 part of sodium sulfite and 68.9 parts of water. The solution was deaerated.

A first coagulating bath was prepared containing 7.8 (wt.) percent sodium sulfate (anhydrous), 11.5 (wt.) percent sulfuric acid, 19.1 (wt.) percent ammonium sulfate and 61.6 (wt.) percent water.

The amylose solution was extruded through a flat die (15 inches by 0.020 inch) which had been placed in the lower part of the first coagulating bath. The partially coagulated amylose film was led across the bottom of the first bath under rollers, withdrawn from the first coagulating solution at the end of the bath, and passed through two consecutive baths containing the following:

|  | Bath II, percent | Bath III, percent |
|---|---|---|
| Sodium Sulfate (Anhydrous) | 9.6 | 7.8 |
| Sulfuric Acid | 5.6 | 10.8 |
| Ammonium Sulfate | 17.5 | 18.3 |
| Water | 67.3 | 63.1 |

After leaving the second and third bath, the completely coagulated film was then passed through a water bath containing 1 percent sodium sulfate, and then through pure water baths where the film was washed free from acid and salts.

The salt free amylose film was then plasticized by passing it through a bath consisting of an aqueous solution containing 12 percent glycerol. It was then dried by passing it over hot rollers. The film which had thus been formed was semi-transparent, and possessed excellent dry strength.

Formed amylose material has the property of being digestible and thus can be advantageously used as casing or tubing in which edible products such as ground meat can be packed. The process of this invention can also be used to form film or tubes composed of mixtures of amylose and other alkali soluble film forming material. Minor amounts of viscose (cellulose xanthate) and alkali soluble cellulose ethers, for example may be incorporated in the caustic amylose solution prior to casting or extruding. Amylopectin, the "B" starch fraction is usually mixed in commercially available amylose powder and can be present in amounts of less than 50 percent in the process of this invention to prepare satisfactory films and tubes.

Various changes and modifications may be made in practicing the invention without departing from the spirit and scope thereof. The invention should therefore not be limited except as defined in the appended claims.

I claim:

1. A method of forming amylose film, tubing, and the like which comprises forming an aqueous solution containing from 15 to 30 percent by weight of amylose and from about 4 to 12 percent by weight of a caustic selected from the group consisting of alkali metal hydroxides, casting said solution into a shaped article of uniform thickness of at least 0.012 inch, and treating the cast solution with an aqueous coagulating solution selected from the group consisting of (1) from about 10 to 18 percent by weight of sulfuric acid and from about 14 to 28 percent by weight of sodium sulfate, and (2) from about 10 to 28 percent by weight of orthophosphoric acid and from about 15 to 35 percent by weight of disodium phosphate.

2. A method of forming amylose film, tubing and the like which comprises forming an aqueous solution containing from 20 to 28 percent by weight of amylose and from about 5 to 7.5 percent by weight of sodium hydroxide, casting said solution into a shaped article of uniform thickness of at least 0.012 inch, treating the cast solution with an aqueous coagulating solution selected from the group consisting of (1) from about 10 to 18 percent by weight of sulfuric acid and from about 14 to 28 percent by weight of sodium sulfate, and (2) from about 10 to 28 percent by weight of orthophosphoric acid and from about 15 to 35 percent by weight of disodium phosphate.

3. The method of forming amylose film, tubing and the like as described in claim 2 wherein the aqueous coagulating solution comprises from 12 to 15 percent by weight of sulfuric acid and from 20 to 24 percent by weight of sodium sulfate.

4. A method of forming amylose film, tubing and the like as described in claim 2 wherein the aqueous coagulating solution comprises from 15 to 25 percent by weight of orthophosphoric acid and from 20 to 30 percent by weight of disodium phosphate.

5. The method of forming amylose film, tubing and the like which comprises forming an aqueous solution containing from about 20 to 28 percent by weight of amylose and from about 5 to 7.5 percent by weight of sodium hydroxide, casting said solution into a shaped article of uniform thickness of at least 0.012 inch, and treating the cast solution with an aqueous coagulating solution comprising from about 10 to 18 percent by weight of sulfuric acid, from about 14 to 28 percent by weight of sodium sulfate and from about 16 to 34 percent by weight of ammonium sulfate.

6. The method of forming amylose film, tubing and the like as described in claim 5 wherein the ammonium sulfate is present in the aqueous coagulating solution in an amount ranging from about 19 to 25 percent by weight.

7. The method of forming amylose film, tubing and the like which comprises forming an aqueous solution containing from about 20 to 28 percent by weight of amylose and from about 5 to 7.5 percent by weight of sodium hydroxide, casting said solution into a shaped article of uniform thickness of at least 0.012 inch, and treating the cast solution with an aqueous coagulating solution comprising from about 10 to 28 percent by weight of orthophosphoric acid, from about 15 to 35 percent by weight of disodium phosphate and from about 15 to 25 percent by weight of ammonium phosphate.

8. The method of forming amylose film, tubing and the like as described in claim 7 wherein the ammonium phosphate is present in the aqueous coagulating solution in an amount ranging from 18 to 21 percent by weight.

9. A method of forming amylose film, tubing and the like which comprises forming an aqueous solution containing from about 20 to 28 percent by weight of amylose, from about 5 to 7.5 percent by weight of sodium hydroxide and about 0.1 percent by weight of sodium sulfite, casting said solution into a shaped article of uniform thickness of at least 0.012 inch, subjecting the cast solution to an aqueous coagulating bath consisting essentially of from about 12 to 15 percent by weight of sulfuric acid, from about 20 to 24 percent by weight of sodium sulfate and from about 19 to 25 percent by weight of ammonium sulfate, washing the coagulated article substantially free of acids and salts, and treating the shaped article with a plasticizing agent.

References Cited in the file of this patent
UNITED STATES PATENTS

| 1,269,678 | Bloede | June 18, 1918 |
| 2,327,516 | Fink et al. | Aug. 24, 1943 |
| 2,328,307 | Thurmond et al. | Aug. 31, 1943 |
| 2,512,968 | Ray | June 27, 1950 |
| 2,902,336 | Heimstra et al. | Sept. 1, 1959 |

OTHER REFERENCES

"Potential Industrial Use of Amylose," by Kaplan, from Cereal Science Today, October 1958, pp. 206–209.